(12) United States Patent
Bohm et al.

(10) Patent No.: US 12,319,446 B2
(45) Date of Patent: Jun. 3, 2025

(54) MODULAR FLYING VEHICLE

(71) Applicants: Ryan Joseph Bohm, Logan, UT (US); Daniel Garrett, Cottage Grove, MN (US)

(72) Inventors: Ryan Joseph Bohm, Logan, UT (US); Daniel Garrett, Cottage Grove, MN (US)

( * ) Notice: Subject to any disclaimer, the term of this patent is extended or adjusted under 35 U.S.C. 154(b) by 0 days.

(21) Appl. No.: 18/495,549

(22) Filed: Oct. 26, 2023

(65) Prior Publication Data
US 2024/0294280 A1 Sep. 5, 2024

Related U.S. Application Data

(60) Provisional application No. 63/449,433, filed on Mar. 2, 2023.

(51) Int. Cl.
| | |
|---|---|
| *B60L 50/60* | (2019.01) |
| *B64U 10/16* | (2023.01) |
| *B64U 20/40* | (2023.01) |
| *B64U 30/29* | (2023.01) |
| *B64U 50/30* | (2023.01) |
| *B64U 80/86* | (2023.01) |
| *B64U 101/61* | (2023.01) |

(52) U.S. Cl.
CPC .............. *B64U 20/40* (2023.01); *B60L 50/60* (2019.02); *B64U 10/16* (2023.01); *B64U 30/29* (2023.01); *B64U 50/30* (2023.01); *B64U 80/86* (2023.01); *B60L 2200/10* (2013.01); *B64U 2101/61* (2023.01)

(58) Field of Classification Search
CPC ........ B64U 20/40; B64U 50/30; B64U 80/86; B64U 50/19; B64U 30/29; B64U 30/291; B64U 2101/69; B64U 2101/61; B64U 2201/10; B60L 50/60; B64C 39/026; B64D 1/22
See application file for complete search history.

(56) References Cited

U.S. PATENT DOCUMENTS

| | | | |
|---|---|---|---|
| 10,703,480 B1 * | 7/2020 | Thrun | B64U 80/82 |
| 2016/0347450 A1 * | 12/2016 | Raniere | B64U 50/35 |
| 2017/0166309 A1 * | 6/2017 | Sekiya | B64D 25/00 |
| 2018/0002013 A1 * | 1/2018 | McCullough | B64U 50/19 |
| 2018/0002027 A1 * | 1/2018 | McCullough et al. B64C 29/0075 | |
| 2018/0194469 A1 * | 7/2018 | Evans | B64D 9/00 |
| 2021/0001983 A1 * | 1/2021 | Fredsted | B64C 39/026 |

* cited by examiner

Primary Examiner — Joshua J Michener
Assistant Examiner — Cindi M Curry
(74) Attorney, Agent, or Firm — Barry Choobin; Patent 360

(57) ABSTRACT

A flying vehicle that is compact and portable and can be carried over the roof rack of a passenger car. The flying vehicle includes an upper chassis and a lower chassis removably mounted to the upper chassis. The lower chassis is positioned below the upper chassis. Eight rotors, a battery pack, and a control unit are mounted to the upper chassis. A seat for the rider is mounted to the lower chassis directly below the battery pack. Such a position of the seat allows a rider to egress from the vehicle safely without requiring the vehicle to land and turn off the rotors.

13 Claims, 8 Drawing Sheets

Fig. 8

MODULAR FLYING VEHICLE

CROSS-REFERENCE TO RELATED APPLICATIONS

This application claims priority from a U.S. provisional patent application Ser. No. 63/449,433, filed on Mar. 2, 2023, which is incorporated herein by reference in its entirety.

FIELD OF INVENTION

The present invention relates to a multi-utility vehicle, and more particularly, the present invention relates to a compact vehicle with capabilities to deliver a passenger for skiing/snowboarding, skydiving, or similar activities.

BACKGROUND

Skiing is a common mode of transportation and recreational activity that involves moving over snow. Skiing is performed downhill using a pair of flat runners. Going uphill on snow is an extremely laborious and painstaking task. Those going downhill for recreational activity may have to return to a starting point uphill which can be challenging. Moreover, obstructions may frequently arise in a path during skiing. Crossing such obstructions can become difficult and may require specialized knowledge, equipment, or assistance. As a result, a person may remain stuck for a long duration. For many recreational activities, such as snowboarding and skydiving, a person starts or lands in a difficult-to-reach area. Reaching or getting back from such a difficult-to-reach area can be a challenge.

In certain cases, a person has to drop off from an airborne vehicle, such as during skydiving. In other cases, such as taking a skier or snowboarder to the top of a mountain or hill, it may not be possible for the airborne vehicle to safely land to allow the rider to egress from the vehicle. In such cases, the rotors of the airborne vehicle cannot be stopped to allow the rider to egress, which requires a design that allows for egress from the vehicle without stopping the rotors.

In the case of skiing or snowboarding, it would be problematic to land with low-mounted rotors spinning given that the snow may be light and deep with hidden objects below the surface which could damage the rotors.

A need is therefore appreciated for a novel vehicle that overcomes the aforementioned drawbacks with skiing and other modes of transport in snow, or for delivery of a passenger in the air such as during skydiving.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a modular flying vehicle for use as a mode of transportation in snow or to other locations where the passenger must egress the vehicle while it is still flying.

It is another object of the present invention that the modular flying vehicle is compact for storage and transportation.

It is still another object of the present invention that the modular flying vehicle is easy to operate.

It is yet another object of the present invention that the modular flying vehicle is safe to operate.

It is a further object of the present invention that the modular flying vehicle allows for egress from the vehicle while the vehicle remains in the air or above the ground.

It is an additional object of the present invention that the modular flying vehicle may automatically land on and be transported by a passenger vehicle.

It is a further object of the present invention that the modular flying vehicle allows for rapid egress from the vehicle while still maintaining safety and good flight characteristics.

It is an additional object of the present invention that the modular flying vehicle can be used in sky diving activities for transporting a person.

It is still an additional object of the present invention that the modular flying vehicle can be remotely controlled.

In one aspect, disclosed is a flying vehicle comprising an upper chassis; a lower chassis removably mounted to the upper chassis, the lower chassis positioned below the upper chassis; a plurality of rotors mounted to the upper chassis; a battery pack mounted to the upper chassis; a control unit mounted to the upper chassis; and a seat mounted to the lower chassis. The seat is removably mounted to the lower chassis. The plurality of rotors comprises eight rotors. The battery pack is positioned along the central axis of the flying vehicle, and the seat is mounted below the battery pack. The seat is configured to be removed from the lower chassis, and the lower chassis is configured to collapse for storage.

In one aspect, each rotor of the plurality of rotors comprises eight rotors, the four at top and four below the respective top rotors. The top rotors are connected to a first power supply and the second rotors are connected to a second power supply, the first power supply and the second power supply are different, wherein the first power supply is connected to a first set of batteries of the battery pack and the second power supply is connected to a second set of batteries of the battery pack. Each rotor is removably coupled to the upper chassis.

In one aspect, one or more struts of the upper chassis are made from a conducting material and coupled to the battery pack, wherein one or more struts are configured to couple to a charging apparatus for charging the battery pack.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting to embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

Disclosed is a modular flying vehicle that is compact in construction and can be used to transport a person in a variety of conditions, situations, and purposes. For example, the module flying vehicle can be used to transport a person uphill in skiing or snowboarding activities. The modular flying vehicle can be used to cross any obstruction during skiing or snowboarding. The modular flying vehicle can be used in skydiving activities. The modular flying vehicle is compact in construction and can be easily carried, such as on top of a passenger car. The disclosed modular flying vehicle allows the rider to be able to exit the modular flying vehicle easily and quickly without requiring the modular flying vehicle to land. The disclosed modular flying vehicle can maintain good stability in the air while the person egresses from the modular flying vehicle. Hereinafter, the terms "vehicle", "flying vehicle" and "modular flying vehicle" are interchangeably used.

Figure 7:
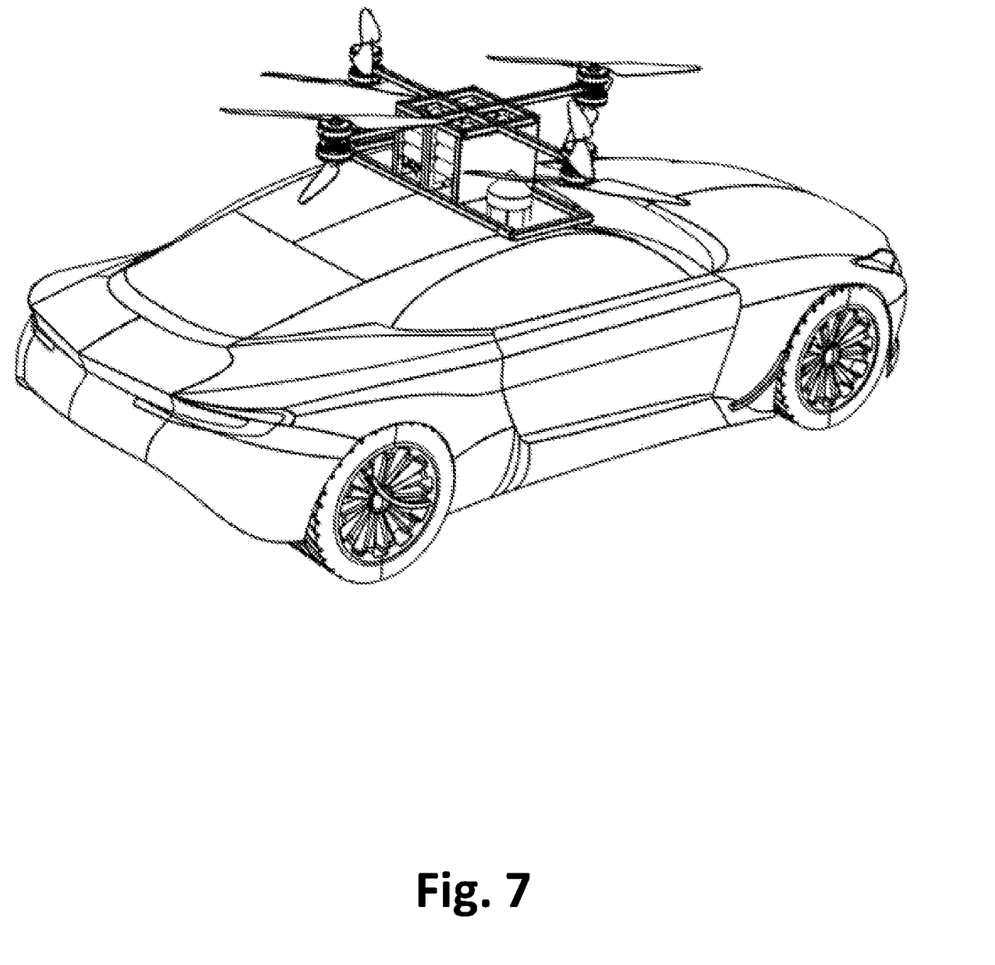
FIG. 7 shows the modular flying vehicle mounted to the roof of the passenger car, according to an exemplary embodiment of the present invention.

Referring to FIGS. 1-6 is a perspective view of the disclosed modular flying vehicle 100. The flying vehicle 100 has an upper chassis 110 and a lower chassis 120. The lower chassis 120 is removably coupled to the upper chassis 110. To the upper chassis can be mounted rotors, a battery pack, and a control unit. Preferably, the battery pack(s) can be mounted close, as much as possible, to the rotors in a densely packaged arrangement. This keeps the conductor lengths as short as possible between the battery pack(s) and rotors which minimizes electrical losses and weight. Also, such a configuration allows the vehicle to be compact for handling and transport. The disclosed flying vehicle can be easily transported on a typical passenger car with a roof rack, as shown in FIG. 7. The lower chassis can be removed and disassembled for storage and transportation and can quickly be assembled and installed.

Figure 1:
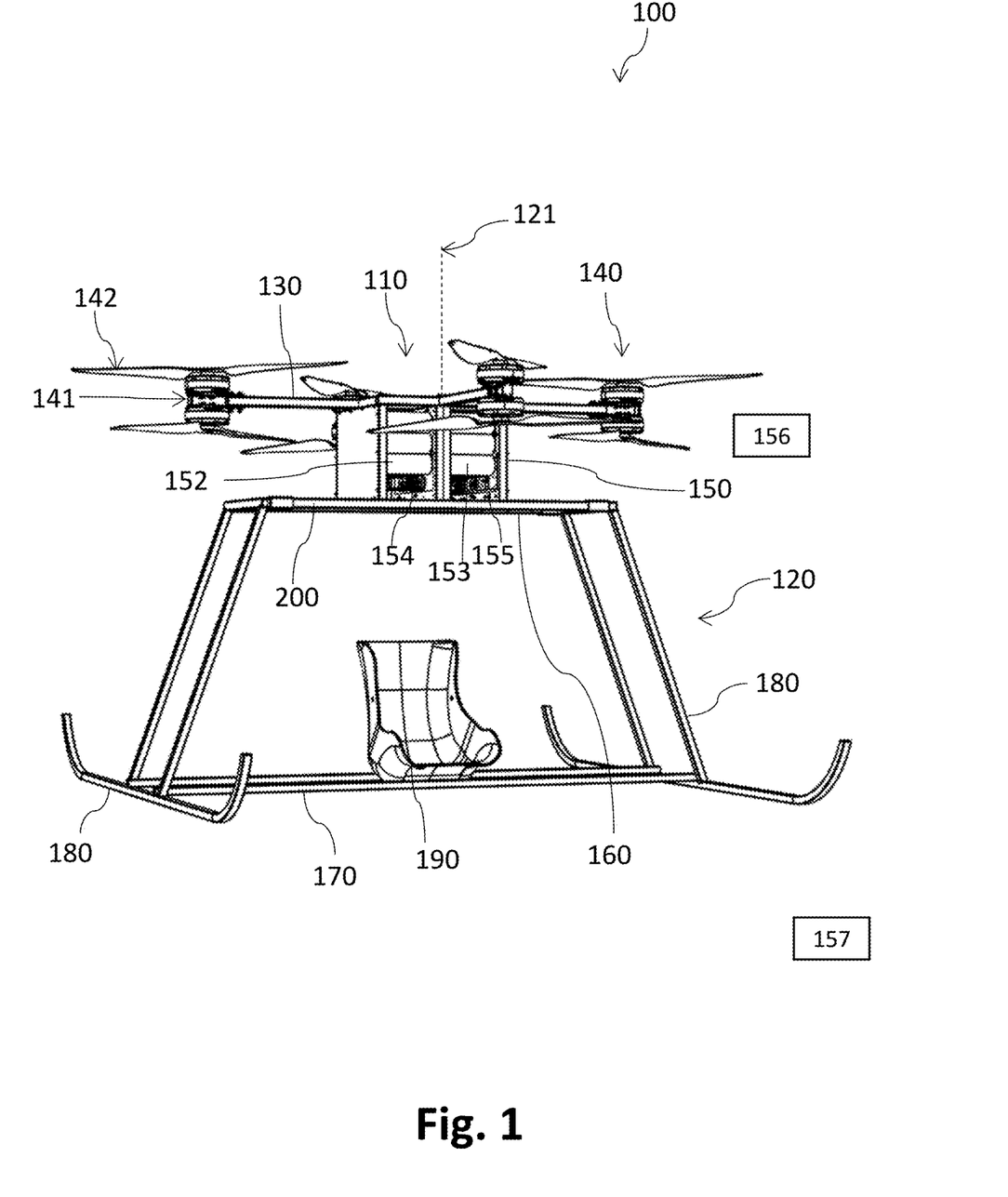
FIG. 1 is a perspective view of the modular flying vehicle, according to an exemplary embodiment of the present invention.
Figure 2:
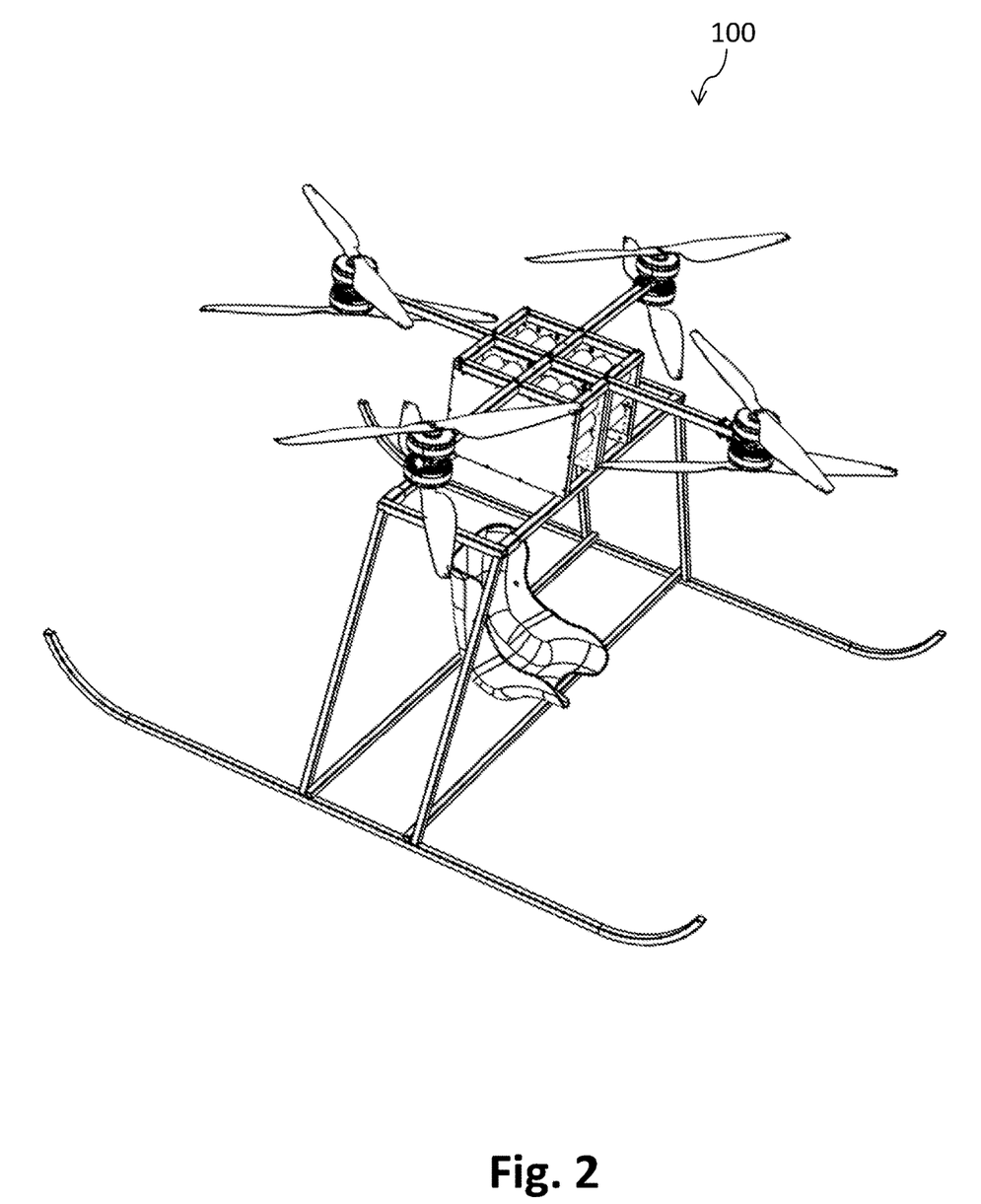
FIG. 2 is another perspective view of the modular flying vehicle, according to an exemplary embodiment of the present invention.
Figure 3:
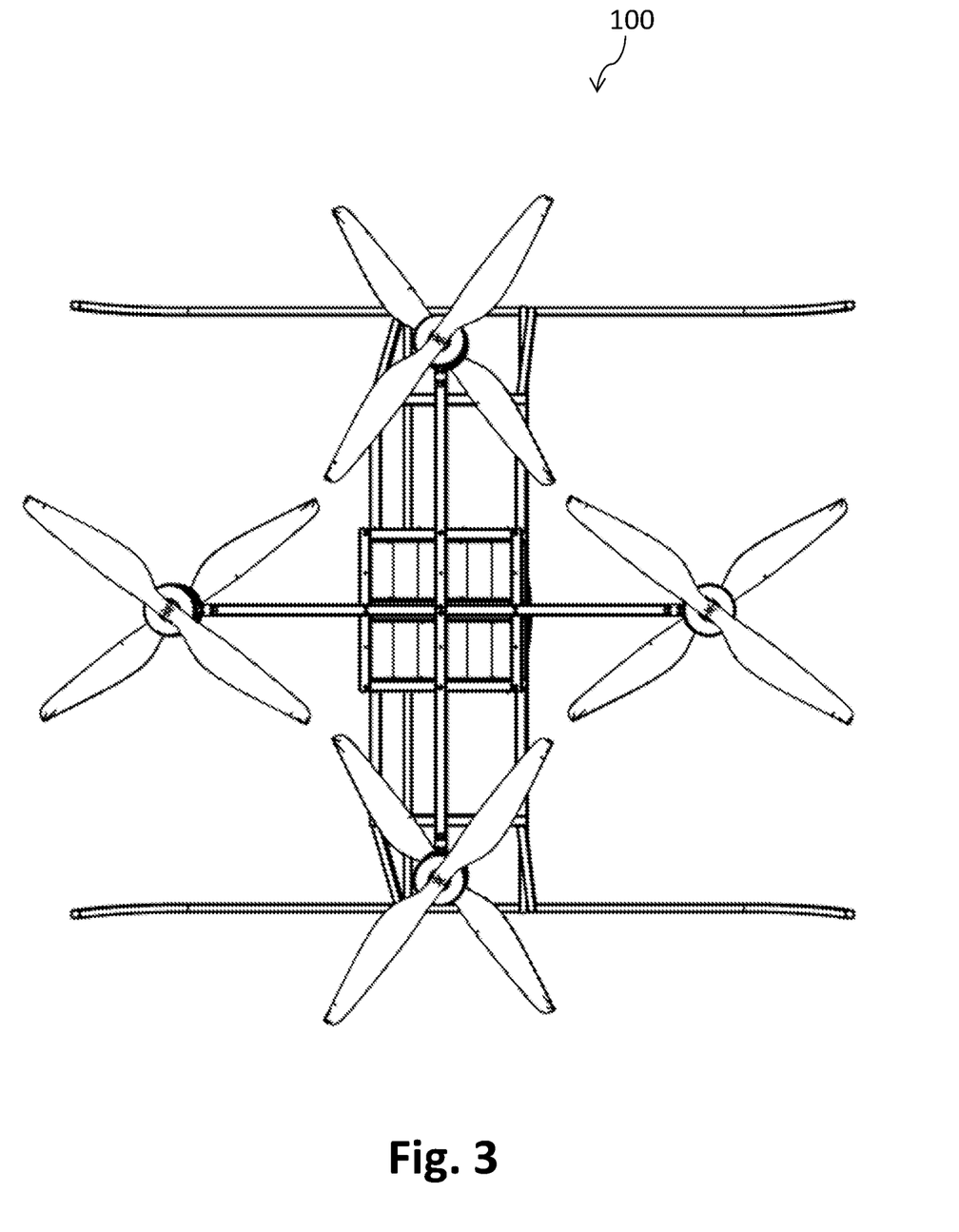
FIG. 3 is a top view of the modular flying vehicle, according to an exemplary embodiment of the present invention.
Figure 4:
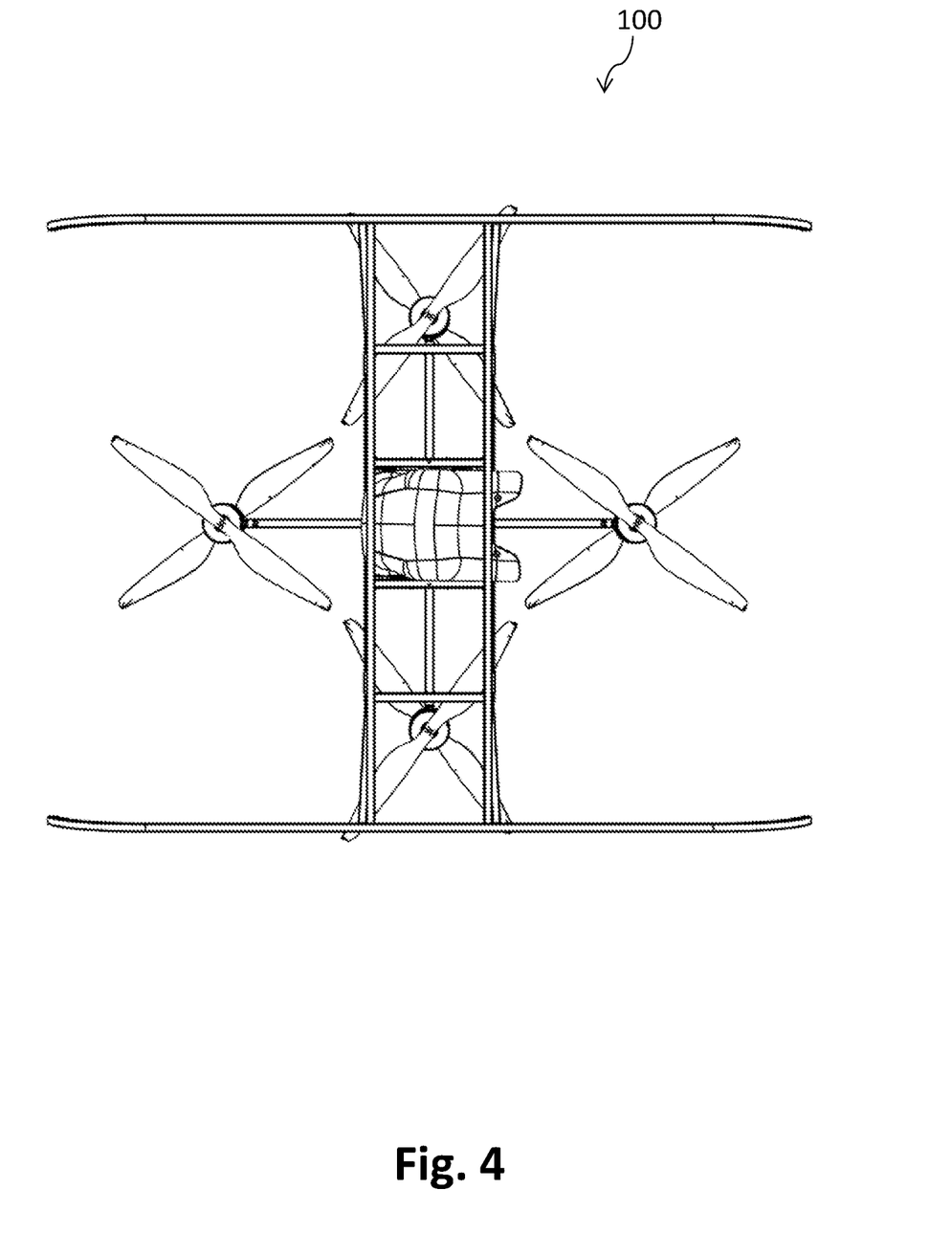
FIG. 4 is a bottom view of the modular flying vehicle, according to an exemplary embodiment of the present invention.
Figure 5:
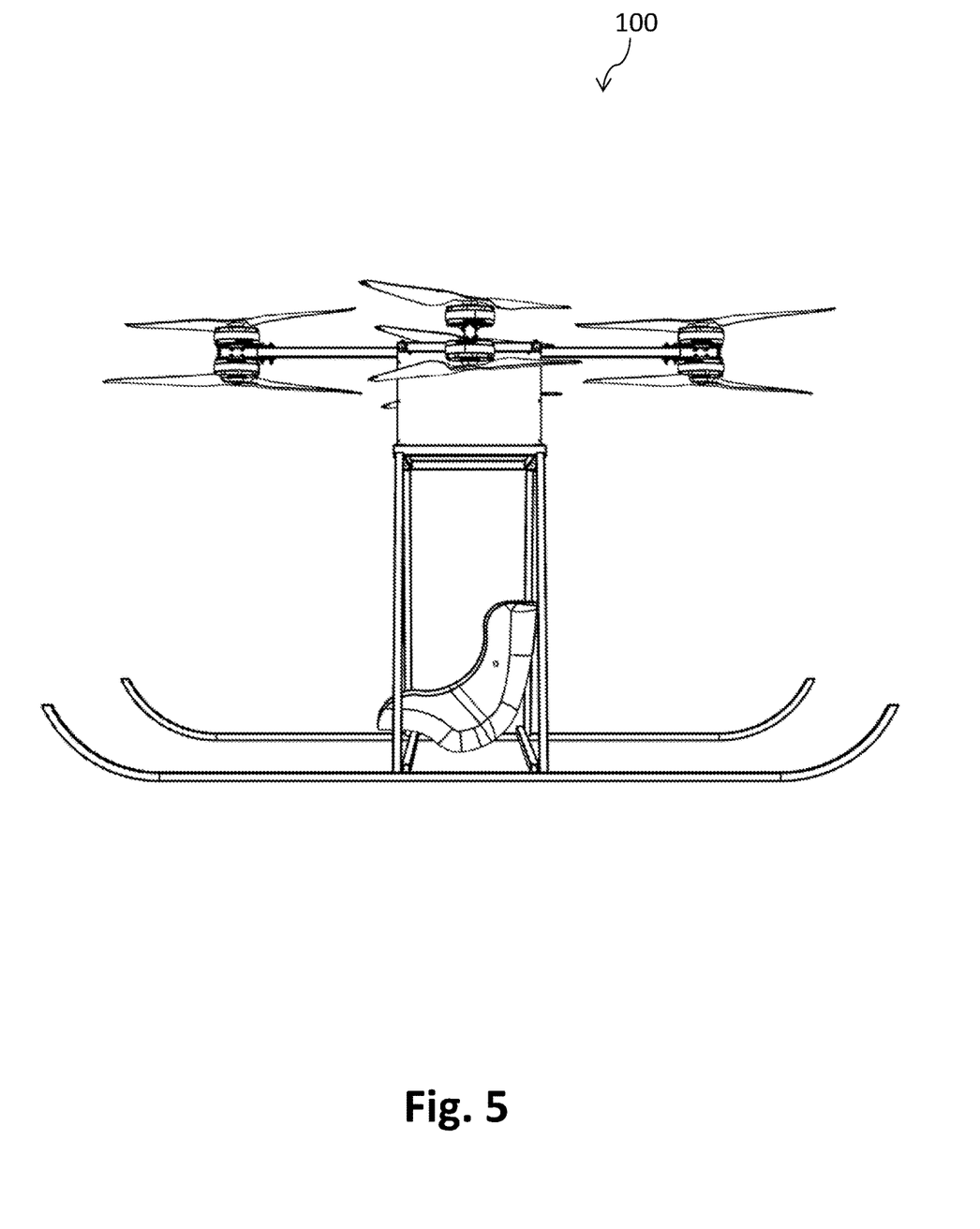
FIG. 5 is a side view of the modular flying vehicle, according to an exemplary embodiment of the present invention.
Figure 6:
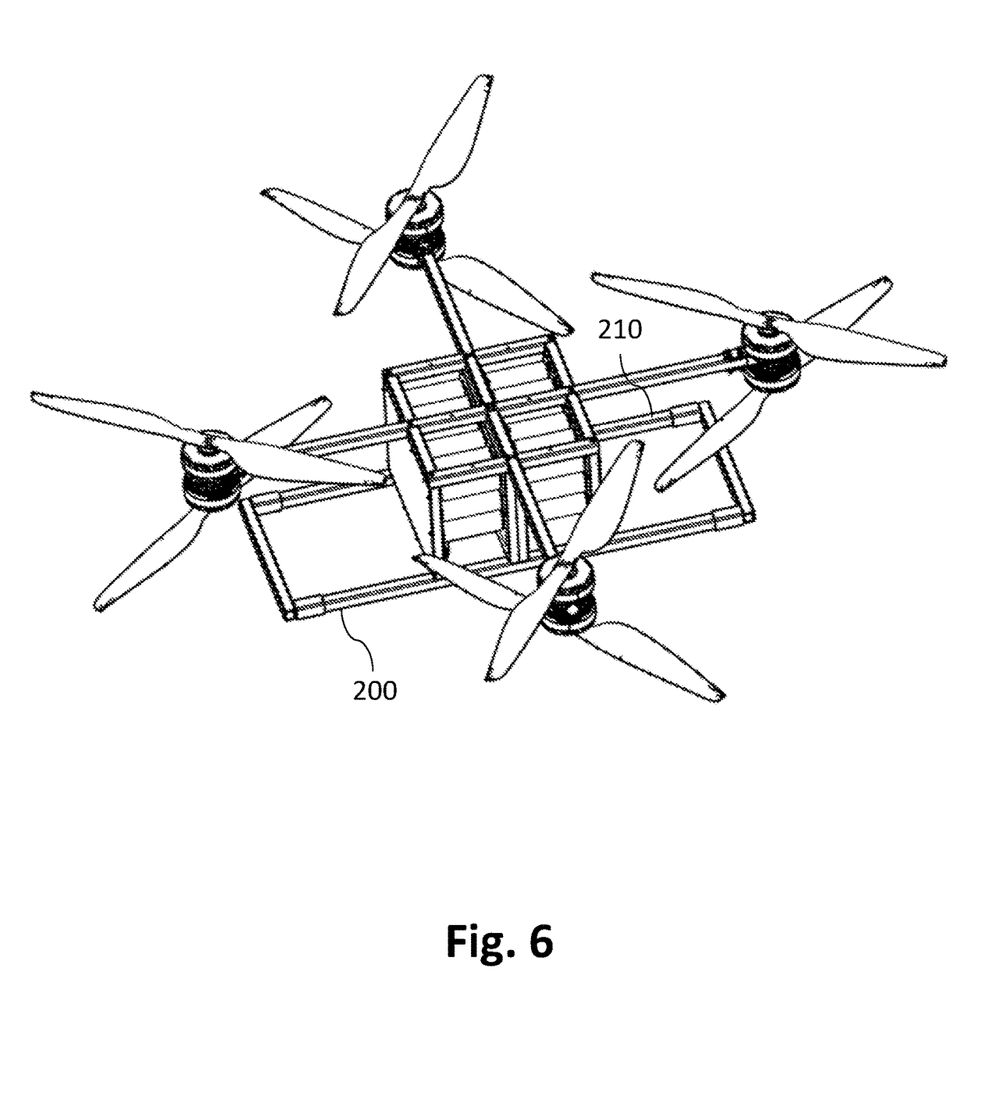
FIG. 6 shows the modular flying vehicle without a chassis, according to an exemplary embodiment of the present invention.

Again, referring to FIG. 1, the upper chassis includes a crossbar 130 to which the four rotors 140 are mounted at four corners of the crossbar. The crossbar includes two legs perpendicular to each other and coupled to each other at their centers. This allows the rotors to be arranged in an overall small area making the disclosed flying vehicle compact and portable. The upper chassis also includes a battery frame 150 over the top of which is the crossbar. The battery pack can be secured within the battery frame. The battery pack can be positioned below a central area of the crossbar so that the center of gravity can be maintained. The units in the battery pack can be arranged in a 3D arrangement for a compact profile that increases efficiency and improves aerodynamics significantly. A rectangular frame 160 can be coupled to the bottom of the battery frame. FIG. 1 further shows a first battery pack 152, a second battery pack 153, a first power supply 154, a second power supply 155, a control unit 156 (shown separately for illustration only), a charging apparatus 157, a motor 141 and a propeller 142 of a rotor 140, and a central axis 121.

The bottom chassis 120 is mounted to the rectangular frame 160 of the upper chassis and the bottom chassis is positioned directly below the upper chassis. The bottom chassis includes a seat frame 170 and two side frames 180. The side frames couples to the seat frame at the bottom portion thereof and to the rectangular frame of the upper chassis at a top portion thereof.

A seat 190 can be mounted to the seat frame, wherein the seat can be positioned directly below the battery pack. The battery pack is in the center of the rotors and the rider is located underneath the battery pack. This location for the rider puts the rider in a region that has the least amount of propeller wash possible for being directly below the propellers and keeps the passenger outside of the propeller arc where the passenger could be struck if the propeller broke apart.

The seat frame includes shock-absorbing struts that extend between the seat and the battery pack on both sides of the rider. The shock-absorbing devices protect the rider from the battery pack in case of impact on the ground. The seating frame also incorporates shock-absorbing features to further protect the rider in the case of impact during an excessive descent rate.

For storage and transportation, the lower chassis can be removed from the upper chassis. The lower chassis includes a seat frame 170 and two side frames 180. The seat frame extends horizontally, and the seat is mounted over the seat frame. The seat can be optionally removed from the seat frame, such as for storage and transportation. The seat frame is of an elongated profile having a proximal end and a distal end. The seat frame at the proximal end can be mounted to the first side frame and at the distal end to the second side frame. The seat frame can be removably coupled to the side frames so that the lower chassis can be dismantled for storage and transportation.

Figure 8:
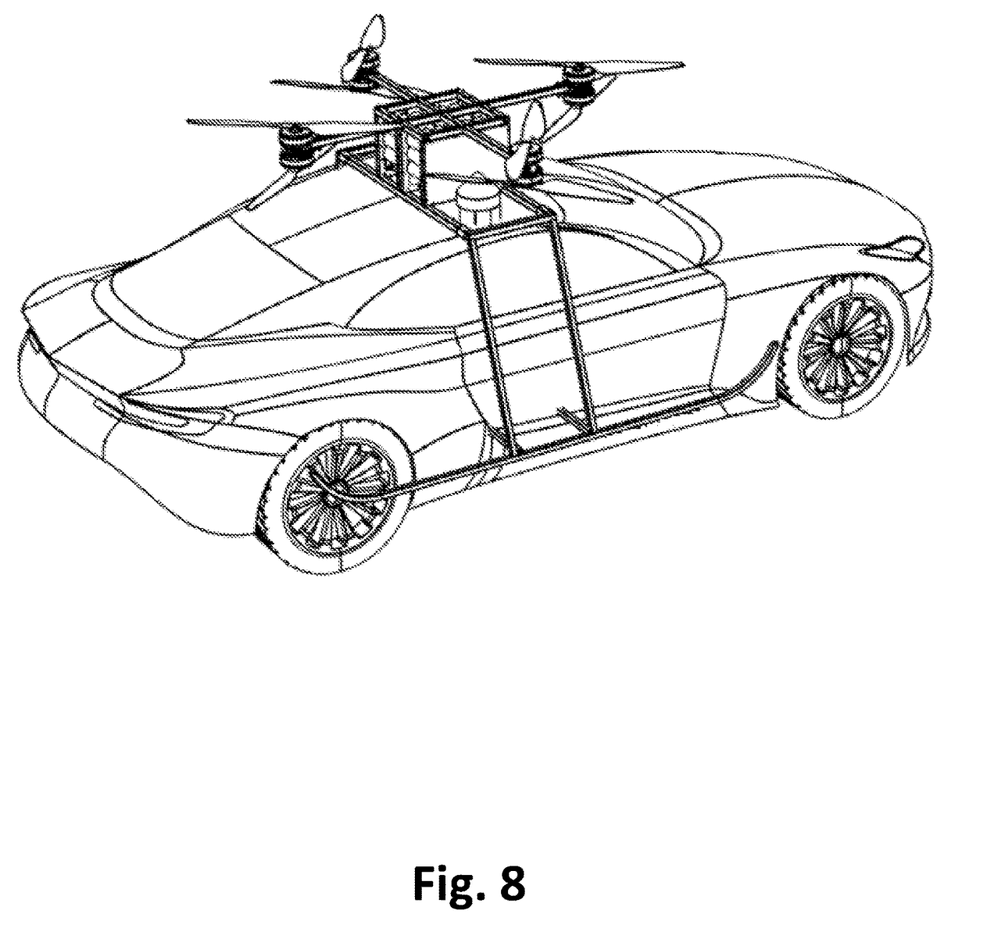
FIG. 8 shows the modular flying vehicle mounted to the roof of the passenger car and having a side frame, according to an exemplary embodiment of the present invention.

Both the side frames are of an elongated profile and extend vertically. The side frames can be removably mounted to the upper chassis. Drawings show the side frame as tubular members that are mounted to the rectangular frame of the upper chassis. The side frames can be mounted to the upper chassis using quick-mount fasteners so that the lower chassis can be quickly removed from the upper chassis. The lower chassis and the upper chassis can be designed to absorb the shocks of the landing of the vehicle on the ground and also absorb sudden shocks of the harsh landing of the vehicle, such as during technical failure and crash landing of the vehicle. This may be important for the safety of the rider. Each of the two side frames includes skids extending from the bottom ends thereof. The skids help to keep the vehicle stable on the ground and allow the vehicle to glide on snow or ground.

In certain implementations, the lower chassis can be stored or transported separately. The lower chassis can be stored or transported as it is or in a dismantled state. It is understood, however, that the upper chassis and the lower chassis are separated for ease of storage and transportation, the disclosed flying vehicle can be stored and transported as it is without any disassembly. For transportation over a passenger vehicle, the upper chassis can be mounted on a transportation rack on a vehicle, such as passenger cars.

For stowing the vehicle on the roof rack of a passenger car, the flying vehicle can be made to land on the roof rack of the vehicle thus preventing the need to manually lift the vehicle. To place the flying vehicle over the roof rack, the seat frame, and the seat can be removed from the lower chassis. The flying vehicle can remain standing on the two side frames. Thereafter, the flying vehicle can fly and can be positioned over the roof rack of the vehicle. Once positioned on the roof rack, the two side frames can also be removed from the upper frame. The two side frames can be mounted to one side of the upper chassis or can be transported separately. It is also envisioned that the vehicle may be equipped with sensors to allow for automated positioning over the vehicle and subsequent automatic landing. Targets may be mounted on the vehicle to assist in this automated landing.

In an alternate embodiment, for mounting the vehicle to the roof rack, the vehicle can be made airborne. Thereafter, the lower chassis can be removed from the upper chassis. Then, the vehicle without the lower chassis can be made to fly and land over the roof rack.

To take off the flying vehicle from the roof rack, the side frames can be mounted to the upper chassis. Once secured, the flying vehicle can be allowed to take off and can be brought down to land or any even surface. Once landed, the rest of the lower chassis can be assembled, and the seat can be mounted to the seat frame of the lower chassis. The flying vehicle can then be ready to fly.

In an alternate embodiment, the flying vehicle can be made to take off from the roof rack without the lower chassis. Once the vehicle is above the ground but still airborne, the lower chassis can be mounted to the upper chassis. Once the lower chassis is mounted to the upper chassis, the vehicle can safely land on the ground.

A person, also referred to herein as a rider, can sit on the seat and the flying vehicle can take off from the ground. It is also possible for the rider to sit in the seat when the vehicle is not on the ground but airborne. Similarly, the rider can egress from the seat when the vehicle lands on the ground or is airborne. For example, during skydiving, the rider can egress from the vehicle while the vehicle is airborne. The position of the seat in the disclosed vehicle is particularly important for the rider to ingress or egress from the seat while the vehicle is airborne.

In certain implementations, the eight rotors can be arranged in four upper rotors and four lower rotors, so that the disclosed modular flying vehicle can be compact but can withstand 100-130 kg weight while attaining a good height. Two rotors can be mounted one above the other i.e., above and downward facing on opposite sides of a bracket. The bracket can have a top plate to which one rotor can be mounted. The bracket has another bottom plate to which the bottom rotor can be mounted. A small plate can extend between the top plate and the bottom plate, and the top and bottom plates can be coupled to the crossbar. The design of the bracket is sturdy and lightweight. In one case, the bracket can be mounted to the crossbar using fasteners, so that the complete rotor can be removed for maintenance. Alternatively, the bracket can be welded or riveted to the crossbar and the rotors can be attached to the bracket using the fasteners.

In certain implementations, the crossbar can be made from two tubular members which reduces the weight and material requirement significantly. Such a design also provides for dense packaging. The battery pack is designed from two identical halves which are integrated into the battery frame. Each half contains all the necessary components to operate independently. These include battery cells, bus bars, charging and discharging fuses and contactors, current sensors, and cell sensing electronics. One battery pack powers the upper rotors while the other powers the lower rotors. If either battery pack fails, the other set of rotors can bring the disclosed vehicle safely to the ground. The rotors can be operated from a single high-reliability flight controller or independent flight controller.

In certain implementations, the voltages in the disclosed vehicle can be limited to 50 V to prevent any electrical shock hazard. The many parts of the upper and lower chassis can be made from aluminum frame that is light in weight thus reducing the weight of the vehicle significantly. It is understood, however, that any other material for the chassis is within the scope of the present invention. The aluminum frame of the chassis can be used as the ground return path ("negative") to the battery pack. The aluminum contact points can be nickel plated or prepared using Alodine/ BONDERITE® (or a similar product) to avoid high resistance from the aluminum oxide layer that forms on the exposed surface thereof.

With the frame being the ground connection to the battery packs, automated connections for fast charging can be easily used. The positive connection point can be made on top of the bottom rectangular frame of the upper chassis in between each of the two battery pack halves. An insulated spacer is placed between the tubular bar 200 and the positive charging bus bars. The bus bars are then connected by cables or bus bars to the charging bus bar points. Two methods can be used to connect a charging apparatus to the vehicle. One is an automated platform and the other is a clamp-on connection.

Automated platform: Two arms extend away from the charging station. The vehicle flies sideways with the battery pack section above the arms and the seat section below. The vehicle may rest on the two arms at bars 200 and 210. Various methods can be employed to ensure that the vehicle slides into the correct position on the arms. Some of these include angling the arms so that when the vehicle touches down, it slides to a stop. Another is a lead screw apparatus that can pull the vehicle against the stop. An angled guide centers the vehicle as it moves toward the stop. Once the vehicle is butted against the stop, two arms with positive electrodes clamp down to pinch the vehicle against the positive and negative charging electrodes.

Clamp-on connection: For manual connection, a positive and negative clamp assembly is manually clamped onto each of the two charging points on the vehicle. Automated detection methods may be used to ensure that the vehicle is properly connected to the charging platform/charging connections prior to commencing charging. For example, the vehicle contains charging contactors that only close when the vehicle knows that a charging station is connected. A novel circuit is employed in both the vehicle and charging station to detect that a proper connection has been made and that charging can take place.

A current source IC can be connected in series with a solid-state relay (SSR) and optocoupler. This circuit is called the charge detection circuit and is connected in parallel with the charging connections. When the vehicle discharge contactors are open and the vehicle is still powered, it goes into charge searching mode. In this mode, the charge detection circuit pulses its SSR at a low frequency and monitors its optocoupler output. When the charge station is searching for a connected vehicle, it turns on a voltage source at a low voltage (around 10 Volts). It monitors the current out of this voltage source. When the vehicle is connected, the charge station will see current flowing at the value set by the vehicle current source and being pulsed at the rate the vehicle pulses its SSR. If the charge station positive and negative conductors happen to be connected to a short or something other than the intended vehicle, this will be detected by a current flow other than that dictated by the vehicle's current source value and by a lack of pulsing behavior as provided by the vehicle low frequency switching of its SSR.

Once the above sequence has been completed, the charging station knows the vehicle is properly connected. Power line communications (PLC) at both the charge station and the vehicle is used to transfer information between the vehicle and the charge station during the charge. By using PLC, only the charging connections are required, and no additional communications connections need to be made. Information to be exchanged between the vehicle and the charge station can include things such as the maximum current available by the charge station, the maximum current the vehicle can accept throughout the charge session, and battery pack temperatures. PLC is used by the vehicle to indicate to the charge station when charging is to cease prior to charging contactors opening.

In certain implementations, for skydiving, additional support packs that could jettison and parachute down to allow for weight shedding and additional energy to go higher can be incorporated into the vehicle.

In certain implementations, the disclosed vehicle can include a seat belt, and other safety gear for keeping the rider safe.

In certain implementations, an aerodynamic design of the vehicle allows airflow through the center of the battery pack when climbing vertically.

In certain implementations, the part of the chassis can be made from shock-absorbing struts that could absorb the shocks during the landing and take-off of the vehicle. The chassis and the seat can be designed to safeguard the rider during accidents.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A flying vehicle comprising:
    an upper chassis;
    a lower chassis removably mounted to the upper chassis, the lower chassis positioned below the upper chassis;
    a plurality of rotors mounted to the upper chassis, wherein the plurality of rotors comprises four upper rotors and four lower rotors, wherein the four lower rotors are mounted below the respective four upper rotors;
    a battery pack mounted to the upper chassis;
    a control unit mounted to the upper chassis; and
    a seat mounted to the lower chassis,
    wherein the four upper rotors are connected to a first power supply and the four lower rotors are coupled to a second power supply, the first power supply and the second power supply are different, wherein the first power supply is connected to a first set of batteries of the battery pack and the second power supply is connected to a second set of batteries of the battery pack,
    wherein each rotor is removably coupled to the upper chassis.

2. The flying vehicle according to claim 1, wherein the seat is removably mounted to the lower chassis.

3. The flying vehicle according to claim 1, wherein the battery pack is positioned along a central axis of the flying vehicle, and the seat is mounted below the battery pack.

4. The flying vehicle according to claim 1, wherein the seat is configured to be removed from the lower chassis, and the lower chassis is configured to be dismantled for storage.

5. The flying vehicle according to claim 1, wherein one or more tubular members of the upper chassis are made from a conducting material and coupled to the battery pack, wherein the one or more tubular members are configured to couple to a charging apparatus for charging the battery pack.

6. A method for transportation of a person, the method comprising:
    providing a flying vehicle comprising:
        an upper chassis;
        a lower chassis removably mounted to the upper chassis, the lower chassis positioned below the upper chassis;
        a plurality of rotors mounted to the upper chassis, wherein the plurality of rotors comprises four upper rotors and four lower rotors;
        a battery pack mounted to the upper chassis;
        a control unit mounted to the upper chassis; and a seat mounted to the lower chassis,
wherein the four upper rotors are connected to a first power supply and the four lower rotors are connected to a second power supply, the first power supply and the second power supply are different, wherein the first power supply is connected to a first set of batteries of the battery pack and the second power supply is connected to a second set of batteries of the battery pack,
wherein each rotor is removably coupled to the upper chassis;
receiving the person on the seat; and
egressing the person from the seat while the flying vehicle is airborne.

7. The method according to claim 6, wherein the seat is removably mounted to the lower chassis.

8. The method according to claim 6, wherein the battery pack is positioned along a central axis of the flying vehicle, and the seat is mounted below the battery pack.

9. The method according to claim 6, wherein the seat is configured to be removed from the lower chassis, and the lower chassis is configured to collapse for storage.

10. The method according to claim 6, wherein each rotor comprises a motor and propellers.

11. The method according to claim 6, wherein one or more tubular members of the upper chassis are made from a conducting material and coupled to the battery pack, wherein the one or more tubular members are configured to couple to a charging apparatus for charging the battery pack.

12. A method for transportation of a person, the method comprising:
providing a flying vehicle comprising:
an upper chassis;
a lower chassis removably mounted to the upper chassis, the lower chassis positioned below the upper chassis;
a plurality of rotors mounted to the upper chassis;
a battery pack mounted to the upper chassis;
a control unit mounted to the upper chassis; and
a seat mounted to the lower chassis,
receiving the person on the seat;
egressing the person from the seat while the flying vehicle is airborne;
landing the flying vehicle over a flat surface;
removing the seat and a seat frame from the lower chassis, the seat is mounted over the seat frame of the lower chassis;
landing of the flying vehicle over a roof of a road vehicle; and
removing the lower chassis from the upper chassis for transporting the flying vehicle by the road vehicle.

13. The method of claim 12, wherein the method further comprises:
autonomous charging of the battery pack of the flying vehicle, wherein tubular members of the upper chassis and/or lower chassis acts as charging point.

\* \* \* \* \*